April 23, 1963 K. ARVANETAKIS ET AL 3,087,058
METHOD AND APPARATUS FOR RADIOGRAPHIC INSPECTION
Filed Sept. 15, 1958 4 Sheets-Sheet 1

Kiryako Arvanetakis
Bryon A. Donzis
INVENTORS

BY Hayden & Pravel
ATTORNEYS

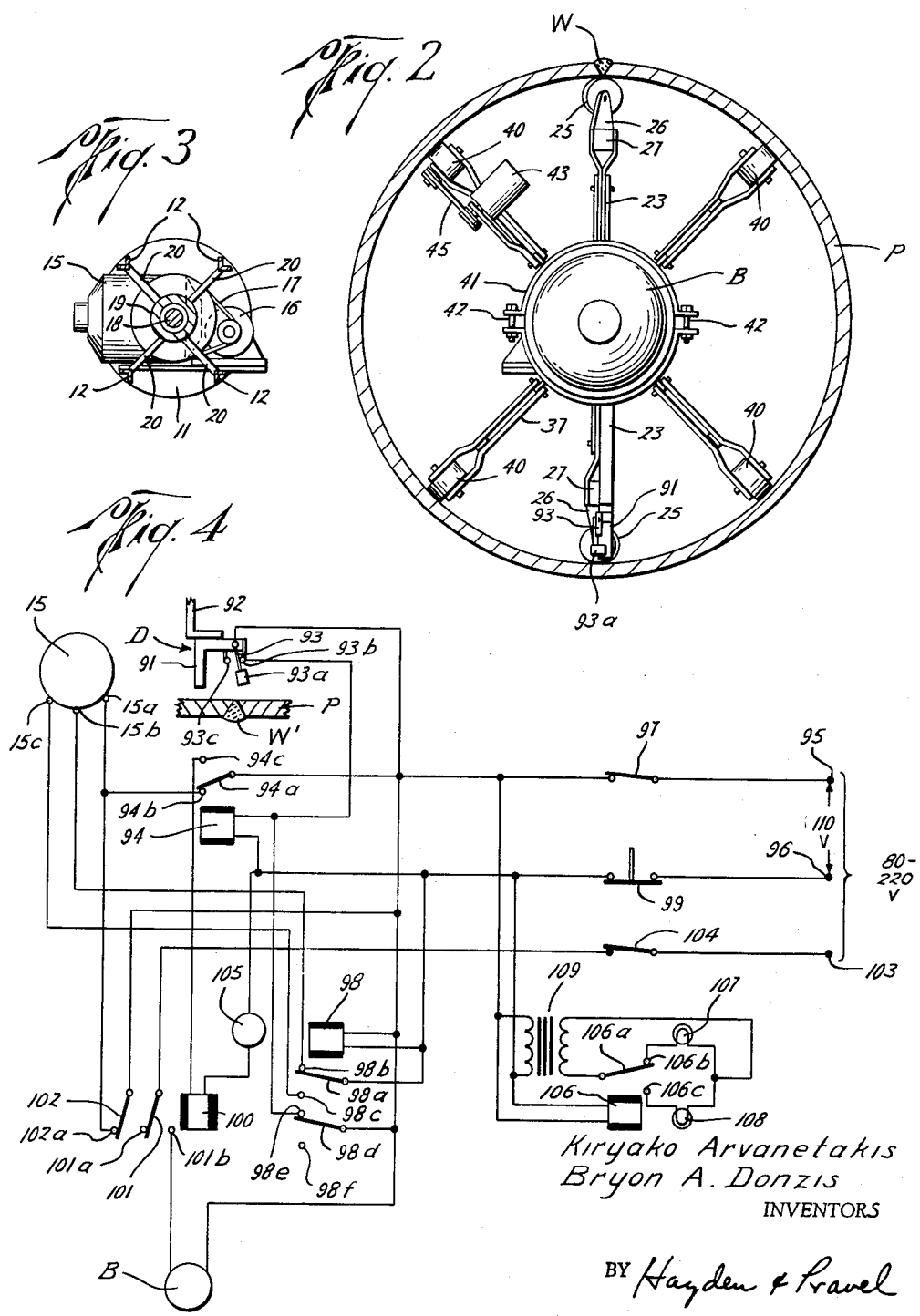

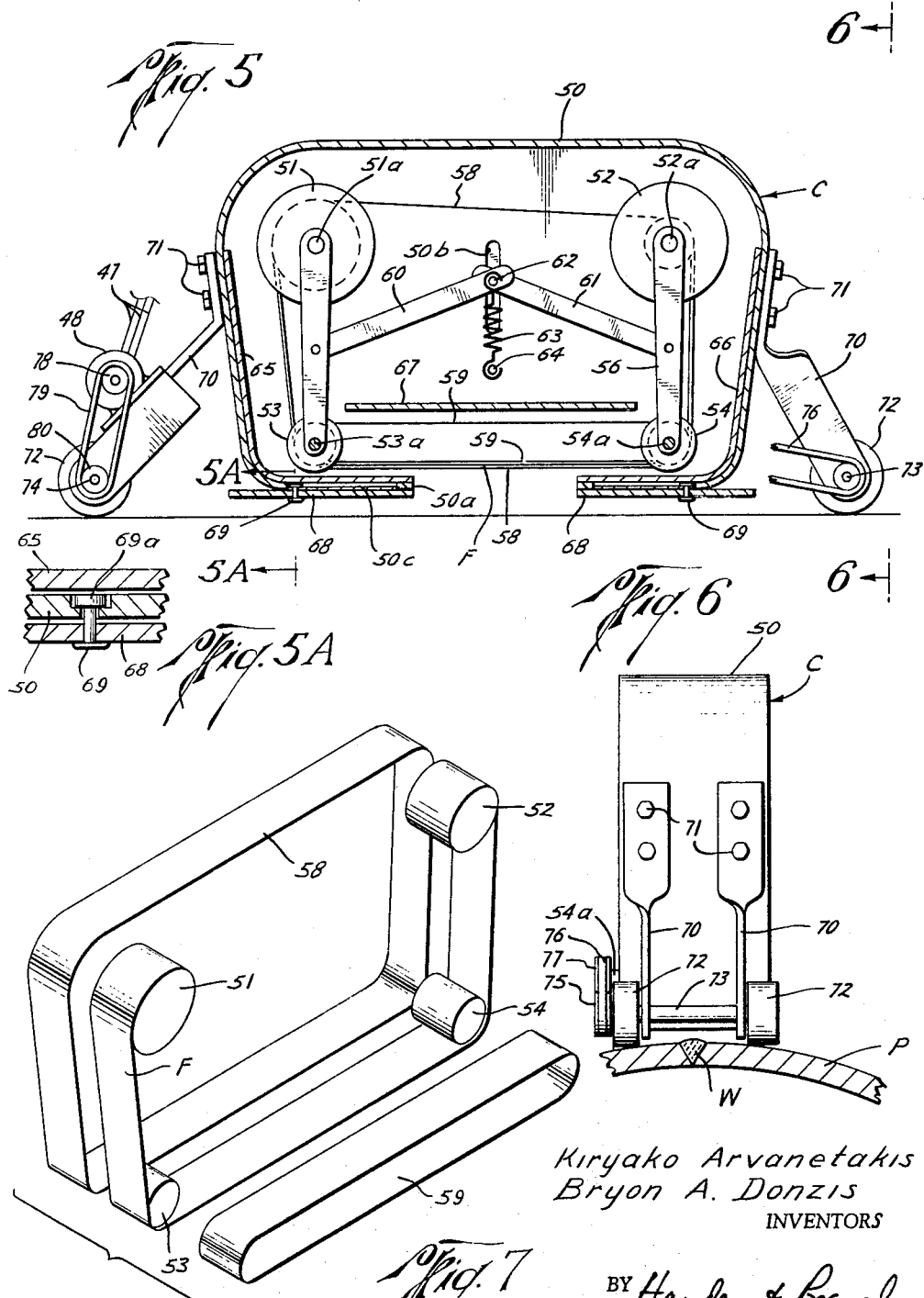

April 23, 1963 K. ARVANETAKIS ET AL 3,087,058
METHOD AND APPARATUS FOR RADIOGRAPHIC INSPECTION
Filed Sept. 15, 1958 4 Sheets-Sheet 4
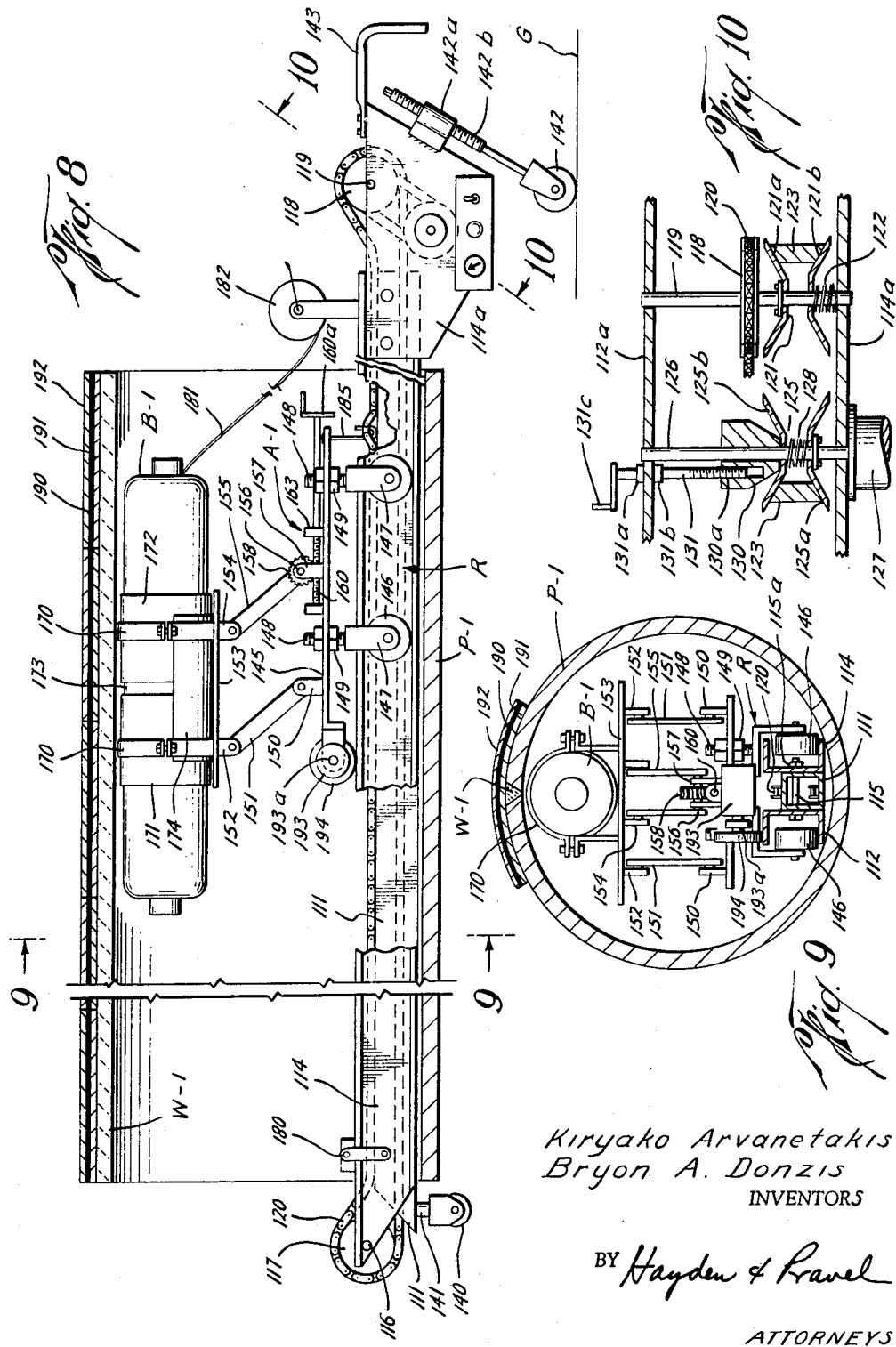
Kiryako Arvanetakis
Bryon A. Donzis
INVENTORS
BY Hayden & Pravel
ATTORNEYS United States Patent Office 3,087,058
Patented Apr. 23, 1963

3,087,058
METHOD AND APPARATUS FOR RADIOGRAPHIC INSPECTION
Kiryako Arvanetakis and Byron A. Donzis, Houston, Tex., assignors, by direct and mesne assignments, to Travel-Ray Corporation, Houston, Tex., a corporation of Texas
Filed Sept. 15, 1958, Ser. No. 761,451
27 Claims. (Cl. 250—52)

This invention relates to methods and apparatus for the radiographic inspection of welds and the like.

This application is a continuation-in-part of United States patent application, Serial No. 743,611 filed June 23, 1958, now abandoned.

An object of this invention is to provide a new and improved method and apparatus for radiographic inspection of welds and the like wherein a radiographic unit is moved relative to the weld or other area with radiographic film on the other side of the weld or other area so as to obtain a film record thereof radiographically during the movement of the radiographic unit.

Another object of this invention is to provide a new and improved method and apparatus for radiographic inspection of welds or the like in pipes, tanks, or other objects, wherein an X-ray or other radiographic film is moved on one side of the weld while an X-ray or other radiographic unit is moved on the other side of the weld, and wherein the movement of the film is coordinated with the movement of the X-ray or other radiographic unit, whereby a film record of a section of the weld is obtained with much greater speed than was possible with prior methods and apparatus.

An important object of this invention is to provide a new and improved method and apparatus for radiographic inspection of welds or the like in pipes, tanks, or other objects, wherein a relatively narrow beam from an X-ray or other radiographic unit is directed towards an X-ray or other radiographic film through the weld or the like as the film and unit move in synchronization, whereby defects such as air bubbles in the weld are accurately recorded on the film in their true size.

Another object of this invention is to provide a new and improved apparatus for holding and feeding radiographic film such as X-ray film wherein the film is fed between two continuous belts of intensifier material without moving relative to such belts while the film is between the belts, whereby scratching and other damage to the film from contact with the intensifier material is prevented.

A further object of this invention is to provide a new and improved apparatus for moving an X-ray or other radiographic unit through a pipe, tank, or other object, wherein such apparatus includes a rotatable head assembly having drive wheels which are skewed with respect to the longitudinal axis of the pipe, tank or other object for imparting a longitudinal movement to the apparatus as said head assembly is rotated.

An additional object of this invention is to provide a new and improved apparatus for radiographic work which is capable of making a record on X-ray film or other radiographic film of a weld or the like which extends longitudinally or circumferentially in a pipe, tank or other object.

A particular object of this invention is to provide a new and improved apparatus for radiographic work which is adapted to move longitudinally in a pipe or the like until a circumferential weld is reached, at which time the longitudinal movement of said apparatus is stopped for the exposure of an X-ray film or other film used in radiographic work to make a record thereon of the condition of such circumferential weld; such stopping of the longitudinal movement of the apparatus being accomplished by a means which does not contact the pipe or the like to effect such stopping whereby accidental stopping of the apparatus by contact with a protuberance or foreign particle other than a circumferential weld is prevented.

Still another object of this invention is to provide a new and improved apparatus for radiographic work, wherein a track means for a radiographic unit is provided for guiding the unit along a weld or similar area as a film record of the weld or similar area is made.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 2 is a view taken on line 2—2 of FIG. 1 and illustrates in particular the arrangement of the wheels for the traveling carriage of the apparatus of this invention;

FIG. 3 is a view taken on line 3—3 of FIG. 1 and illustrates details of the traveling carriage of the apparatus of this invention;

FIG. 4 is an electrical diagram illustrating the electrical circuit utilized in the apparatus of this invention when it is desired to automatically stop the traveling carriage for subjecting a circumferential weld or similar area to raise from a radiographic unit;

FIG. 5 is a view, partly in elevation and partly in section, illustrating in detail the film holder or carrier for the film used in the apparatus illustrated in FIG. 1; FIG. 5A is a view taken along lines 5A—5A of FIG. 5;

FIG. 6 is an end view of the film holder or carrier taken on line 6—6 of FIG. 5;

FIG. 7 is an exploded view, partly schematic, to illustrate the details of construction of the film holder or carrier illustrated in FIG. 5;

FIG. 8 is a view, partly in elevation and partly in section, illustrating a modified form of the invention which includes track means for guiding a radiographic unit;

FIG. 9 is a view taken on line 9—9 of FIG. 8; and

FIG. 10 is a view taken on line 10—10 of FIG. 8.

Figure 1:
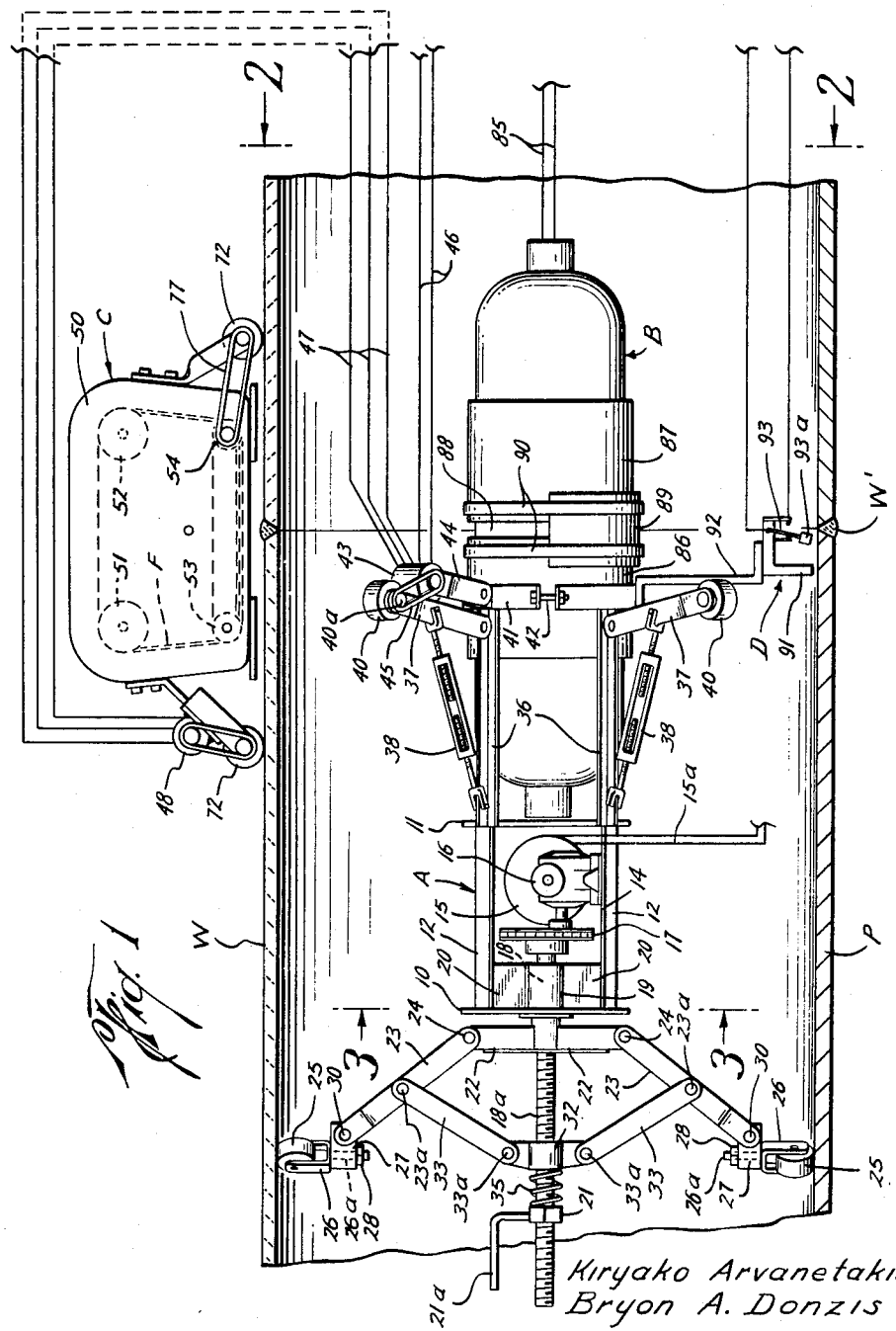
FIG. 1 is a view, partly in section and partly in elevation, illustrating the apparatus of this invention.

In the drawings, the letter A designates generally a traveling carriage which is adapted to hold and carry a radiographic unit B of construction for emitting X-rays or other radiographic rays. As will be explained in detail, a conventional radiographic unit B is modified to control the beam of the X-rays or other radiographic rays which are emitted therefrom.

A film holder or carrier C is provided for moving a film F relative to the weld W in synchronization with the traveling carriage A, and film F within the carriage C is fed at a rate which is coordinated with the movement of the carriage A so as to continuously expose previously unexposed film to the rays from the radiographic unit B as both the carrier C and the traveling carriage A move relative to the weld W or other area through which the rays are directed. As will be explained more in detail hereinafter, during such movement of the traveling carriage A with the radiographic unit B and the movement of the carrier C in synchronization therewith, the beam of the X-rays or other radiographic rays from the unit B is controlled so that the width of such beam is relatively narrow as compared to normal X-ray beams, and the sides of the beam are substantially parallel to each other rather than substantially cone-shaped as in the ordinary beam of X-rays or other radiographic rays. Such control of the beam from the radiographic unit produces an accurate picture on the film F of any defect or irregularity in the weld W or other area which is subjected to the rays.

When the apparatus of this invention is used for obtaining a film record of a circumferential weld or similar area with the radiographic unit B, the carriage A can continue to move while an X-ray or other film record is obtained. However, if the carriage A is stopped while obtaining the film record of the circumferential weld, the electrical circuit of FIG. 4 is preferably utilized because it provides a means in the electrical circuit for automatically stopping the movement of the traveling carriage A when the unit B has reached a position for emitting rays through a circumferential weld such as the weld W' illustrated in FIG. 1 of the drawings. The details of such electrical circuit will be described hereinafter, but briefly stated, such electrical circuit is provided with a detection means D (FIG. 1) which is positioned away from and out of contact with the weld W' and the rest of the pipe P at all times, but nevertheless such detection means serve to stop the movement of the traveling carriage A when the radiographic unit B is in the proper position with respect to the circumferential weld W', and after a predetermined period which is sufficient for obtaining the film record of the circumferential weld W', the carriage A is automatically started again in its travel through the pipe P or other tubular body for movement to the next circumferential weld therein.

Considering now the details of the invention, the traveling carriage A includes a frame which may be made in numerous ways, but as illustrated in FIGS. 1–3, such frame includes a front circular plate 10 and a rear plate 11 which are interconnected with and are welded to angle irons or similar interconnecting bars 12 which are illustrated as being four in number. A support plate 14 is welded or otherwise secured to the two lowermost angle irons or bars 12 to provide a platform for receiving a motor 15 or similar power equipment. The motor 15 operates through a gear box 16 of the known construction, and a chain or belt 17 to drive a shaft 18 which is mounted in a bearing 19 by spider members 20 of the frame which are welded to the bearing 19 and to the angle irons or bars 12. The forward end of the shaft 19 is provided with external threads 18a for receiving a nut 21 thereon. The shaft 18 has fixed arms 22 extending radially or laterally therefrom at a point forward of the front of the frame plate 10. The fixed arms 22 are welded or otherwise secured to the shaft 18, and as shown in the drawings there are two of such fixed arms 22 and they are diametrically opposite from each other. Pivoted arms 23 are connected to the fixed arms 22 with pivot pins 24 so as to permit the pivoted arms 23 to swing or pivot relative to the fixed arms 22. A wheel or roller 25 is mounted at the outer end of each of the pivoted arms 23 and each of such wheels 25 is mounted in a fork 26 for rolling movement in engagement with the inner surface or walls of the tubular pipe or body P. The fork 26 has a threaded pin 26a connected thereto for extending through a mounting block 27. The threaded pin 26a has a nut 28 threaded thereon for tightening the fork 26 on the mounting block 27 in a particular position. However, upon the loosening of the nut 28, the position of the fork 26 and therefore the angle of inclination of the wheel 25 may be adjusted. The block 27 with each wheel 25 is secured to the outer end of the pivoted arm 23 therewith by any suitable means such as a bolt or screw 30 which holds the block 27 in a fixed position with respect to the arm 23. However, upon a loosening of the screw or bolt 30, the position of the block 27 with respect to the arm 23 may be adjusted. For normal operation, and as will be more evident hereinafter, the wheels 25 are mounted in a skewed position or at an angle of inclination with respect to the longitudinal axis of the pipe or of the tubular body P through which the traveling carriage A is moving. Because of such skewed relationship of the wheels 25, a longitudinal force in the direction from left to right as viewed in FIG. 1 is imparted to the entire carriage A as the wheel assembly which includes the two wheels 25 is rotated.

The arms 23 are pivoted inwardly and outwardly with respect to each other for positioning the rollers 25 in pipes of different diameters. For resiliently holding the wheels 25 in firm engagement with the inner surface or wall of the pipe through which the carriage A is moving, the arms 23 are connected with a central ring 32 which is slidably mounted on the threaded portion 18a of the shaft 18. Links 33 extend from the central ring 32 to the pivoted arms 23, with pivoted connections 33a and 23a at the ends of the links 33 connecting them to the ring 32 and the arms 23, respectively. The ring 32 is urged towards the frame of the carriage A by means of a spring or similar resilient member 35 which is urged into contact with the ring 32 by the rotation of the nut 21 on the threads 18a of the shaft 18. A handle 21a may be provided on the nut 21 for facilitating the rotation of the nut 21 to effect the movement of the ring 32. The spring 35 is of course unnecessary to position the wheels 25 at a desired diameter, but such spring 35 functions to provide a certain amount of inward movement for the wheels 25 in the event there are certain irregularities in the inside walls of the pipe P through which the carriage A is moving. In other words, should the wheels 25, either or both, contact an object within the pipe P which tends to force the wheels 25 inwardly, the arm 23 with the wheel 25 which is forced inwardly would force the link 33 therewith against the ring or collar 32 and such collar 32 would move against the spring 35 which would permit a limited amount of movement of the ring 32 towards the nut 21.

The frame of the carriage A also includes angle irons or other members 36 (FIG. 1) which are welded at their forward ends or are otherwise secured to the plate 11. Preferably there are four of such irons or members 36 and each of such members has mounted thereon a pivoted wheel support lever 37, each of which has therewith a turnbuckle 38 of known construction which extends from one of the irons 36 to one of the wheel support levers 37 to selectively position the wheels 40 carried by the levers 37 in engagement with the inner surfaces or walls of the pipe P or other body in which the traveling carriage A is adapted to move. Such wheels 40, which are preferably four in number, support the rear portion of the traveling carriage A.

A clamping band 41 which is formed of two substantially semi-cylindrical sections is welded or otherwise secured to the members 36 with the sections being connected together with suitable retaining means 42 which preferably includes a bolt and a nut as shown in the drawings. The X-ray or other radiographic unit B is positioned with its forward end within the frame of the carriage A and rearwardly of the frame plate 11 so that the clamping sections of the ring 41 are positioned around the body of the radiographic unit B and are clamped thereto with the bolts 42 to hold the unit B in position at the rear of the carriage A. It will be appreciated that other suitable means for securing the radiographic unit B to the carriage A may be provided within the scope of the invention.

A Selsyn motor 43 is mounted on a suitable leg 44 connected to the clamping band 41 and a belt 45 or other means interconnects the Selsyn motor 43 with the shaft 40a of one of the wheels 40 so that upon movement of such wheel 40, the shaft 40a is rotated and that rotation is imparted through the belt 45 to the Selsyn motor 43. Electrical wires 46 supplying 110 volts for exciting the field winding of the Selsyn motor 43 lead to such motor 43, and as is well known, upon the rotation of the armature of the motor 43, the motor 43 becomes a generator which transmits its voltage through the lines 47 which lead to and are connected with a Selsyn motor 48 mounted on the film carrier C for a purpose to be hereinafter explained.

When the apparatus of this invention is used for obtaining a film record of the weld W or other similar longitudinal area by passing X-rays or other radiographic rays through the weld W to the film F, the carrier C is used for moving along the pipe P, normally on the external surface thereof over the longitudinal weld W. The carrier C is in effect a film holder or camera and it is particularly adapted for movement in synchronization with the traveling carriage A and also for feeding the film F in coordinated relationship with the movement of the carriage A.

The details of the construction of the film holder or carrier C are shown in FIGS. 5-7. The holder or carrier C includes a housing 50 which is completely closed except for an opening or aperture 50a in the lower wall thereof. A film supply reel 51, a film take-up reel 52, and guide rollers 53 and 54 are mounted within the housing 50. The guide roller 53 is mounted on a shaft or axle 53a which extends through the side walls of the housing 50 so as to permit rotation of the guide roller 53 while preventing any lateral or vertical shifting of such roller 53. A support arm 55 is mounted for pivotal movement about the shaft or axle 53a and it extends upwardly and carries a pin or axle 51a on which the reel 51 is mounted for rotation relative thereto. The pin or axle 51a is not connected to the housing 50 so that the arm 55 and the reel 51 are free to swing about the axle 53a.

The roller 54 is mounted on an axle 54a which extends through the side walls of the housing 50 so that the roller 54 can rotate, but lateral or vertical movement of the roller 54 relative to the housing 50 is prevented. A support arm 56 which is similar to the support arm 55 is mounted on the axle 54a and extends upwardly therefrom. The arm 56 carries an axle 52a on which the take-up reel 52 is mounted for rotation. The axle 52a is not connected to the housing 50 and therefore the reel 52 and the arm 56 therewith are adapted to pivot or move about the axle 54a.

The film F is initially wound up on the supply reel 51 prior to the exposure thereof to the X-rays or other rays from the radiographic unit. As seen in FIGS. 5 and 7 of the drawings, the film F is fed from the supply roll 51 around the guide rollers 53 and 54 and is wound up upon the film take-up reel 52. An endless belt 58 made of conventional X-ray intensifier material such as calcium tungstate or thin lead extends around the film F on the outside thereof. Another belt 59 of conventional X-ray intensifier material is mounted on the inside of the guide rollers 53 and 54 for endless movement on the inside of the film F as the film F moves across the opening 50a of the housing 50. Therefore, in the passage of the film F across the opening 50a, the film F is between the intensifier belt 58 and the intensifier belt 59. Both of such belts 58 and 59 are made of conventional X-ray intensifier material, but if radiographic rays other than X-rays are emitted from the unit B, other intensifier materials may be used for the belts or bands 58 and 59. The relationship of the belts 58 and 59 with the film F is shown in FIG. 5, and an exploded view of such parts is shown schematically in FIG. 7 to further illustrate the relationship. It will be appreciated that the belt 59 is positioned inside of the film F and therefore in contact with the guide rollers 53 and 54 and the belt 58 is positioned around the reels 51 and 52 and the reels 53 and 54 in actual use as illustrated in FIG. 5. Also, means are preferably provided for urging the support arms 55 and 56 away from each other to maintain the desired tension on the intensifier belt 58. In the preferred form of the invention as illustrated in FIG. 5, the belt 58 is maintained taut at all times by means of scissor arms 60 and 61 which are pivotally connected to the support arms 55 and 56, respectively. The scissor arms 60 and 61 are hinged or pivoted together at a pivot pin 62 which is adapted to move in a guide groove 50b formed on the inside surface of the side wall of the housing 50, although it will be appreciated that other means for guiding the ends of the arms 60 and 61 longitudinally may be provided. A spring 63 extends from a fixed pin 64 to the hinge pin 62 connecting the scissor arms or links 60 and 61 to urge the pin 62 downwardly toward the fixed pin 64. Such downward urging causes the arms 60 and 61 to tend to move downwardly at their connected ends at the connecting pin 62 and therefore the support arms 55 and 56 are urged outwardly about the axles 53a and 54a. Such outward movement of the arms 55 and 56 urges the reels 51 and 52 outwardly to apply tension to the belt 58 for maintaining it taut.

Lead protector plates 65, 66 and 67 are mounted in the housing 50 for protecting the film F from exposure to the X-rays or other radiographic rays except those which pass through the opening 50a of the housing 50. Sliding lead doors 68 are also preferably provided on the housing 50 for completely closing the opening 50a when the film carrier C is not in use. Each door 68 carries a fixed pin 69 which has a flange 69a which is positioned in a slot 50c in the housing 50 so that the doors 68 may slide towards each other for closing the opening 50a when desired.

The housing 50 has four wheel brackets 70 which are secured to the housing 50 with bolts 71 or other securing means. Each of the four brackets carry a wheel 72, and preferably the pair of wheels at the forward end of the film carrier C are mounted on a common axle and the pair of wheels at the rear of the housing 50 are also mounted on a common axle. Such axle for the rear wheels is indicated in FIG. 6 by the numeral 73. The forward axle is identified with the numeral 74.

As the film carrier C is moved on the top surface or exterior of the pipe P over the longitudinal weld W or other area, the wheels 72 roll in contact with the surface of the pipe P. One of the wheels 72, the left hand rear wheel as shown in the drawings, has a pulley 75 connected therewith over which a drive belt 76 extends. Such belt 76 extends to a pulley 77 mounted on an extension of the shaft 54a so that movement of the wheel 72 is directly transmitted to the shaft 54a through the belt or similar drive 76. The rotation of the shaft 54a imparts rotation to the guide roller 54 and such rotation also serves to feed the film F from the supply reel 51 around the guide roller 53 and the guide roller 54 to the take-up reel 52. Likewise, the movement of the guide roller 54, which is in fact also a feed roller, imparts movement to the intensifier belts 58 and 59. Since the outside belt 58 is in contact with the film F as it passes around the feed roll 54 and also the other roll 53 and the reels 51 and 52, the take-up roll 52 is actually rotated by the frictional contact between the belt 58 and the film F being wound upon the reel 52. Since the guide roller 54 serves to feed the film F and the belts 58 and 59 simultaneously, it will be evident that they move at the same rate across the opening 50a and therefore there is no relative movement between the film F and the intensifier belts 58 and 59 in the areas in which they are in contact with each other. Therefore, scratching of the film or other damage thereto by reason of relative movement between the film F and the belts 58 and 59 is prevented.

The Selsyn motor 48 is connected to one of the front wheels 72 through a pulley 78 mounted on the Selsyn motor 48 by a belt or other similar drive means 79 which extends from the pulley 78 to a pulley 80 mounted on the axle 74 with the pair of front wheels 72. The operation of the Selsyn motor 48 therefore causes movement of the belt 79 and consequent movement of the front wheels 72. Since the Selsyn motor 48 is operated in synchronization with the Selsyn generator or motor 43 on the traveling carriage A (FIG. 1), the film carrier C is therefore moved at the same rate as the traveling carriage A. Also, since the feeding of the film F is geared to the rotation of the rollers or wheels 72, as previously explained, the feeding of the film F is likewise coordinated at the same rate as the movement of the carriage A through the pipe P. For that reason, the film F is fed through the film holder or carrier C at the same rate as the radiographic unit B moves along in the pipe P.

In the operation of the apparatus of this invention and in carrying out the method of this invention for obtaining a film record of the longitudinal weld W or other similar area, the motor 15 for driving the traveling carriage A is supplied with electrical power through electrical lines 15a or other suitable electrical conductors which extend to an accessible source of electric power. Likewise electrical wires 85 lead from the radiographic unit B to a suitable source of electrical power. It will be appreciated of course that the various electrical wires used in conducting the electrical power to the various electrically operated units may be grouped together in a single electric cable for convenience in operation, if so desired. When the rays from the X-ray or other radiographic unit B are to be used for making a film record of the longitudinal weld W, the radiographic unit B has positioned thereon lead shields 86 and 87 which completely surround the radiographic unit B near the central portion thereof so as to cover the central portion of the unit B except for a relatively narrow circumferential area 88 through which the X-rays or other rays from the radiographic unit B are emitted. The normal emission of rays from a radiographic unit is in the shape of a cone which extends circumferentially from the unit, and by the shielding with the lead shields 86 and 87, the cone shaped rays or beam is restricted to a narrow width beam which has substantially parallel sides and which reaches only a small area of the weld W' as compared to the normal area which would be covered by the rays from the unit B if they were unshielded. The amount of the space between the shields 86 and 87 may be adjusted, but it is important to position such shields 86 and 87 relatively close to each other so that the circumferential space therebetween is small because as the unit B moves relative to the weld W, an overlapping of the beam on the weld would occur as the film F is moved in synchronization with the unit B so that instead of a hole appearing on the film F in its actual size, it would appear in an elongated shape. For example, if an air hole or pocket in the weld W is present, it will appear as a black spot on the film F, and with the beam from the unit B restricted as explained previously, such hole would appear in its actual size on the film F because the relatively narrow beam from the unit B crosses the hole or other defect only when the beam is actually aligned with the hole or defect, whereas with a cone shaped beam, the hole or defect would be subjected to X-ray beams for a period of time and since the film F is moving also, the hole or other defect would be recorded on the film over an extended length of time which would appear on the film as an elongated area as compared to the actual size of the hole itself. An additional semicylindrical shield 89 is normally provided at the lower portion of the circumferential exposed space 88 on the unit B so that the entire beam from the unit B is directed in the general direction of the weld W or other area which is to be subjected to the rays from the unit B. Metallic circular bands 90 are positioned around the shields 86, 87 and 89 as indicated in FIG. 1 of the drawings to hold the shields in position, but it will be appreciated that other means may be utilized for holding the shields on the unit B. The bands 90 are preferably adapted to slide so that the shield 89 may be readily moved in the event the entire circumferential beam from the area 88 of the unit B is desired for subjecting a circumferential weld such as the weld W' shown in FIG. 1 to the rays from the unit B.

In any event, assuming that the longitudinal weld W is to be subjected to X-rays or other radiographic rays to make a film record on the film F, the unit B is moved through the pipe P or is moved relative to the weld W wherever it may occur, by driving the traveling carriage A. It is of course possible that the traveling carriage A may be pulled manually through the pipe or relative to the weld W, and other types of apparatus than that shown in FIG. 1 may be used for moving the unit B through the pipe P or relative to the weld W. In fact, a modified construction for moving the unit B through the pipe P or relative to the weld W is illustrated in FIGS. 8-10 of the drawings, as will be more fully explained hereinafter. Likewise, the film F is moved relative to the weld W and the movement of the film F is coordinated with the movement of the radiographic unit B so that the movement of the film F and the beam from the unit B is at the same rate relative to the weld W. As previously explained, it is possible to move the unit B through the pipe P with the traveling carriage A which includes the motor 15 for driving the wheel assembly on which the skewed wheels 25 are positioned. The rotation of the wheel assembly causes the skewed wheels 25 to rotate together relative to the pipe P and to impart a longitudinal pulling force to the entire carriage A for moving the unit B through the pipe P. The movement of the film carrier or holder C at the same rate as the radiographic unit B is accomplished by the operation of the Selsyn motor 43 which is driven by one of the rear wheels 40 on the carriage A. The Selsyn motor 43 is in effect a generator which transmits electrical power to the Selsyn motor 48 mounted on the film carrier C so that the Selsyn motor 48 is then able to drive one of the wheels 72 of the film carrier C at the same rate as the wheel 40 is moving. It will therefore be obvious that the carrier C will move at the same rate as the radiographic unit B. To coordinate the film F in its movement with the movement of the unit B, the film F is fed by another one of the wheels 72 so that the movement of the film F is coordinated with the movement of the unit B. Therefore, the movement of the film carrier C and the carriage A with the radiographic unit B are controlled electrically so that a continuous record is made on the film F for a particular section or portion of the weld W, but it will be appreciated that the carrier C and the unit B may be moved by hand relative to the weld W rather than with the electrical automatic controls illustrated. For example, a wire or rope may be connected to the carriage A and also to the carrier C for pulling them together relative to the weld W. It should also be noted that the advantages of the moving radiographic unit B for obtaining a film record of the longitudinal weld W may be obtained by using a plurality of X-ray film cassettes which are positioned adjacent to the weld W on the opposite side of the weld W from the unit B, as will be explained more in detail in connection with the form of the invention shown in FIGS. 8-10. In such case, the film carrier C would not be used.

In some instances, it is desirable to make a film record of a circumferential weld such as the weld W' with the apparatus of this invention. Such a film record of a circumferential weld such as the weld W' may be made while the carriage A and the unit B thereon are moving in the pipe P. If the film record is made while the carriage A and the unit B are moving, a special electrical circuit will not be used since the motor 15 is simply driven by electrical power supplied thereto through wires 15a. Even a gasoline engine or any other power source which can be operatively connected for imparting rotation to the wheels 25 may be employed. However, if it is desired to stop the movement of the carriage A while making the film record of a circumferential weld, then the electrical circuit of FIG. 4 and the detector means D illustrated in FIG. 1 would preferably be employed. The detector means D includes an L-shaped permanent magnet 91 which is mounted on a bracket 92 extending from the frame of the carriage A. A microswitch 93 is mounted in connection with the magnet 91 so that when the magnet 91 reaches the position substantially adjacent to the circumferential weld W', the lines of magnetic flux passing in a substantially circular path around the magnet 91 and through the metal of the pipe P are increased by reason of the increased thickness of the material at the weld W' sufficiently to move the magnetic piece 93a on the switch 93 from the electrical contact 93b to the open electrical stop 93c. In other words, as the unit B moves through the pipe P or other similar object, the magnetic piece 93a remains in contact with the electrical contact 93b by means of the spring within the usual microswitch 93 or any other resilient means, but when the magnetic lines of flux passing from the magnet 91 through the magnetic piece 93a are increased sufficiently, which occurs when the magnet 91 is in proximity to the weld W', then the microswitch 93 is moved to the open position by moving the magnetic piece 93a towards the magnet 91 until it contacts the stop 93c. It will be observed that the magnet 91 and the magnetic piece 93 are positioned away from the inside surface of the pipe P and therefore do not contact same. By reason of such construction, an inadvertent stopping of the unit B in its travel down the pipe P is prevented even though there may be foreign objects or raised portions within the pipe P which might otherwise interfere with a mechanism which is in engagement with the pipe P. In FIG. 4 of the drawings, the switch 93 is shown in the closed position and in FIG. 1 of the drawings the switch 93 is shown in the open position. As will be more evident, when the switch 93 is in the closed position current is supplied to the motor 15 of the carriage A to drive same, but when the switch 93 is moved to the open position, the motor 15 is stopped and therefore the movement of the carriage A relative to the pipe P is stopped.

With the circuit illustrated in FIG. 4 of the drawings, the movement of the unit B with the carriage A through the pipe P is automatically stopped when the opening 88 of the unit B is in alignment with the weld W', the unit B is automatically operated for obtaining a film record of the circumferential weld W', and thereafter the unit B and the carriage A are again moved longitudinally to the next circumferential weld W'. The particular circuit illustrated in FIG. 4 of the drawings accomplishes such movement and automatic control, but it will be appreciated that a simplified electrical circuit could be utilized if the automatic control is not desired. The circuit of FIG. 4 includes a relay 94 with a movable contact member 94a therewith and electrical contact points 94b and 94c. Electrical power such as indicated in FIG. 4 as 110 volts alternating current is supplied to the electrical terminals 95 and 96. When the master switch 97 is closed as indicated in FIG. 4 of the drawings, the electrical circuit is completed to the relay 94 through the microswitch 93. The motor 15 of the carriage A is therefore energized through the electrical terminals 15a and 15b of the motor 15. When such electrical power is imparted to the motor 15, the motor 15 is of course operated to drive the wheel assembly on the traveling carriage A for moving the carriage A within the pipe P, as previously explained. The current would flow through the terminal 15a to the motor 15 and then through the motor to the terminal 15b and from there to the movable arm 98a of a relay 98 which is in contact with electrical contact point 98b. Therefore the electrical current flows through the contact 98a and then through a reversing switch 99 to the other terminal 96 connected to the 110 volts alternating current.

When the carriage A approaches the weld W', the additional metal on the weld W' causes the permanent magnet 91 to pass a greater number of magnetic lines of force through the metallic magnetic piece 93a so as to open the switch 93 by moving the magnetic piece 93a from the contact 93b to the contact 93c. Such movement of the switch 93 opens the circuit to the relay 94 so that the movable member 94a moves from the contact 94b to the contact 94c. The current to the motor 15 is therefore cut off and the traveling carriage A is therefore stopped in its longitudinal movement. At the same time, the contact of the relay arm 94a with the electrical contact 94c closes the electrical connection from the terminal 95 to a relay 100 which has movable arms 101 and 102 therewith. When the relay 100 is actuated, the arms 101 and 102 move from contact with the electrical contacts 101a and 102a, respectively and the member 101 moves into contact with an electrical contact 101b so as to close the circuit to the X-ray or other radiographic unit B. The X-ray unit B is supplied with voltage ranging from 80 to 220 volts alternating current which is connected between the terminal 95 and another terminal 103. A switch 104 to the X-ray circuit is preferably provided for opening and closing same manually. An X-ray timer motor 105 is in the circuit with the relay 100 and it is of standard construction for limiting the amount of time that the current flows in such circuit so that after a predetermined amount of time, the timer 105 is opened to open the electrical line connected therewith so that the relay 100 is again rendered inactive and that causes the contacts 101 and 102 to return to the position shown in FIG. 4. Therefore, the exposure with the rays from the radiographic unit to the weld W' is limited to the desired predetermined time and such time is terminated when the timer 105 opens the circuit to let the contacts 101 and 102 move to the position shown in FIG. 4.

At that time, the contact 102 is moved back into position in contact with the electrical contact 102a so that then electrical power is caused to pass from the terminal 95 to the terminal 15a of the motor 15 through the electrical relay arm 102. The other side of the circuit is completed through the terminal 15b to the terminal 95 through the relay arm 98a. Thus, electrical power is again supplied to the motor 15 for moving the traveling carriage A, and when the detector means D moves away from the weld W', the microswitch 93 is again closed and is returned to the position shown in FIG. 4 so that the circuit is then completed through the action of the relay 94 holding the relay member 94 in contact with the electrical contact 94b, as previously explained. Therefore, the movement of the carriage A continues until the next circumferential weld is encountered by the detector means D, at which time the cycle is repeated, and of course, the cycle is repeated for each successive circumferential weld that is encountered.

When it is desired to reverse the movement of the motor 15 for reversing the direction of travel of the traveling carriage A to withdraw the carriage A from the pipe P, or for moving the carriage A in a reverse direction for any reason, the push button 99 is depressed to cause a momentary break in the circuit of relays 98 and 106. Such break moves the relay member 98a into contact with the electrical contact 98c and it also moves the relay member 106a from engagement with the electrical contact 106b into engagement with the electrical contact 106c. A known type of ratchet means holds the relays in the changed position after the switch 99 is returned to the closed position. Such change in the position of the relays in effect reverses the field windings on the motor 15 since the terminal 95 is connected to the motor 15 through the terminal 15c instead of the terminal 15b. It is to be noted that the relay member 98d is normally in engagement with electrical contact 98e, but it is movable therefrom to a stop 98f when the relay member 98a moves from the contact 98b to the contact 98c. The relay 106 is used to function in conjunction with the relay 98 so as to operate indicator lights 107 and 108 which are in a circuit with a transformer 109 so that the light 107 indicates to the operator that the carriage A is moving in the forward direction and the light 108 indicates to the operator that the carriage A is moving in the reverse direction.

It should be pointed out that when the apparatus of this invention is used for making a film record of the circumferential welds in a pipe P, either while the carriage A is moving or stopped, the entire circumferential area 88 is open so that the entire weld W' is exposed to the beam of rays from the radiographic unit B. In other words, the semi-circular shield 89 is removed when the circumferential welds W' are being subjected to the X-rays or other radiographic rays from the unit B. Also, as previously pointed out, the space 88 is narrow to restrict the rays being emitted from the unit B to only substantially radial rays which are substantially parallel to each other, and which would normally lie in a plane substantially perpendicular to the axis of the pipe P. Various means may be used for positioning the film around each circumferential weld W' on the exterior of the pipe P to receive the rays from the unit B. For example, the usual film cassettes may be used which are basically made from a strip of film sandwiched between outer layers of X-ray intensifier material. Such cassettes would completely surround the weld W' so that the entire weld W' would be subjected to the rays from the unit B simultaneously. Also, if desired the film carrier C may be moved around the pipe over the weld W' while the beam of rays is being emitted from the unit B. As the film carrier C is moved, manually or otherwise, the drive from one of the wheels 72 to the guide and feed roller 54 would cause the film F to be fed as the carrier C is moved around the outside of the pipe P. Of course, other types of known cameras or film carriers could be used around the weld W' in place of the carrier C. It should also be pointed out that when the carriage A is stopped during the making of a film record of a circumferential weld W', the unit B is operated only during the period when the carriage is stopped, as previously explained. However, when the carriage A continues to move during the making of the film record of the circumferential weld W', the unit B is actually operating or emitting rays therefrom continuously as the carriage A moves. Alternatively, the unit B may be intermittently turned on so as to be certain the unit B is emitting rays when in the vicinity of each circumferential weld W'. Even though the carriage A and the unit B are moving while making a film record of the circumferential weld, a well-defined non-blurred film record of the weld is obtained due to the narrow restricted area 88 which permits only the emission to the weld of the rays which extend substantially radially or in a plane substantially perpendicular to the central axis of the pipe P.

In FIGS. 8–10, a modified construction is illustrated for guiding the X-ray or radiographic unit B–1 relative to a weld W–1 for the purpose of making an X-ray photograph or other record on film of the longitudinal weld W–1 as the radiographic unit B–1 is moving. As illustrated in FIGS. 8–10, the weld W–1 is in a pipe P–1, although the weld W–1 may be found in other objects.

The radiographic unit B–1 is moved relative to the weld W–1 by means of a traveling carriage A–1 which, as will be explained, is adapted to move on a guide means or rail assembly R. The rail assembly R may be formed in numerous ways, but as illustrated in FIGS. 8–10, such rail assembly R includes a central rail section 111 which is tubular in construction and is preferably square in cross-section as best seen in FIG. 9 of the drawings. A pair of channel members 112 and 114 are connected to the central member 111 by means of bolts 115 and nuts 115a therewith, or by any other suitable securing means so that the central section 111 and the two channel sections 112 and 114 form a unitary structure.

At the forward end of the rail assembly R, an axle 116 extends between the channel sections 112 and 114, and forwardly of the forward end of the tubular section 111 as best seen in FIG. 8 for thereby supporting a sprocket 117 for movement without contacting the central tubular member 111. A similar sprocket 118 is mounted on a shaft 119 at the rear of the guide means or rail assembly R, and a link chain 120 is positioned around the sprockets 117 and 118 so that the upper reach of such chain 120 passes over the top part of the central tubular member 111 while the lower reach of the chain 120 passes through the opening of the tubular section 111, as seen in FIGS. 8 and 9. The gear 118 is driven with a source of power so as to cause the chain 120 to move relative to the sections 111, 112 and 114 of the rail assembly R. Preferably, the gear 118 is driven by an electric motor with a variable speed transmitter such as a "PIV" variable speed controller for changing the speed of movement of the gear 118 and therefore the rate of travel of the chain 120.

One suitable means for controlling the rate of movement of the gear 118 is illustrated in FIG. 10 which shows the shaft 119 positioned between plates 112a and 114a which are extensions of the channel members 112 and 114, respectively. On the same shaft 119 with the sprocket 118 is a variable pulley 121 which has a fixed side 121a and a movable side 121b. A spring 122 normally urges the pulley side 121b towards the fixed pulley side 121a. A pulley belt 123 extends from the adjustable pulley 121 to another adjustable pulley 125 which is provided with a pulley side 125a secured to a shaft 126 and a movable pulley side 125b. The shaft 126 extends in the same direction as the shaft 119 and through the side extensions 112a and 114a, with one end thereof being connected with a motor shaft 127 which leads to the source of power such as an electrical motor (not shown). A spring 128 is positioned between the sides of the pulley 125 to urge the movable pulley side 125b away from the fixed pulley side 125a. The position of the side 125b with respect to the side 125a of the pulley 125 is determined by the position of a slidable collar or ring 130 which is mounted on the shaft 126. The position of the collar or ring 130 is adjusted by the rotation of a threaded shaft 131 which is in threaded engagement with a threaded opening 130a in the ring 130. The shaft 131 is prevented from moving longitudinally by positioning same through the side extension 112a, with stop blocks 131a and 131b on each side of the extension 112a, as shown in FIG. 10. A handle 131c is preferably provided for manipulating the shaft 131 so as to move the ring 130 inwardly and outwardly as the shaft 131 is rotated.

By adjusting the position of the collar 130 upon a manipulation of the handle 131c, the ratio between the pulleys 121 and 125 may be readily adjusted for controlling the speed transmission from the motor shaft 127 to the sprocket 118 and thus to the endless chain 120. For example, if it is desired to increase the gear ratio between the pulleys 125 and 121 to increase the rotational speed of the sprocket 118, the handle 131 is rotated to move the ring 130 towards the fixed pulley side 125a. Such movement causes the side 125b of the pulley 125 to compress the spring 128 and to move towards the fixed side 125a of the pulley 125. Such movement of the pulley side 125b towards the pulley side 125a causes the portion of the pulley belt 123 which is in engagement with the sides of the pulley 125 to be forced radially outwardly away from the shaft 126 and that increases the tension on such pulley belt 123. As the tension on the belt 123 increases, the belt 123 will be caused to move inwardly toward the shaft 119 as it passes over the pulley 121 so as to actually force the pulley side 121 to be away from the side 121a. Therefore, the portion of the belt 123 passing over the pulley 125 will be operating on a greater diameter than the portion of the belt 123 passing over the pulley 121. In effect, therefore, the gear ratio between the pulleys 125 and 121 is increased so as to increase the speed of the sprocket 118. A reverse movement of the ring or sleeve 130 will of course reverse the direction of movement of the belt 123 and will decrease the ratio between the pulleys 125 and 121 to decrease the speed of the sprocket 118.

The rail assembly R includes a forward support wheel 140 which is mounted with a suitable bracket 141 on the lower side of the central tubular section 111 (FIG. 8). Such wheel 140 is adapted to roll on the lower surface of the pipe P-1 as the rail assembly R is moved into position for the guiding of the unit B-1 through the pipe P-1, as will be more evident hereinafter. The rear portion of the rail assembly R is supported on another wheel 142 which is adapted to engage the ground G while the rail assembly R is being inserted into the pipe P-1. The wheel 142 is connected to the rear portion of the rail assembly R, preferably on the extension 114a with a threaded sleeve 142a through which extends a threaded wheel support rod 142b. By rotating the threaded rod 142b relative to the internally threaded support member 142a, the position of the wheel 142 may be changed and the rail assembly R may be properly leveled when in position within the pipe P-1. Other means for adjusting height of the wheel 142 may of course be utilized. A handle 143 is also attached to the rear of the rail assembly R for serving to assist in manipulating the rail assembly R as it is moved into position within the pipe P-1. Also, for retrieving the rail assembly R from the pipe P-1, the handle 143 is particularly useful for applying a pulling force to the rail assembly R.

The traveling carriage A-1 includes a platform 145, which preferably has four support wheels 146 connected thereto. Each of the wheels 146 is mounted on an L-shaped bracket 147 which has a stud bolt 148 welded thereto and extending upwardly therefrom through suitable openings in the platform 145. Lock nuts 149 with each bolt 148 hold the bracket 147 therewith in position so that all four of the wheels 146 roll within the channels 112 and 114, with two of the wheels 146 rolling in the channel 112 and the other two of the wheels 146 rolling in the channel 114.

On the top of the platform 145, a pair of fixed support arms 150 are secured by welding or other suitable securing means, and to each of such arms 150, a link 151 is pivotally connected. The upper ends of the links 151 are pivotally connected to brackets 152 which are welded or otherwise secured to a support plate 153 for holding the X-ray or other radiographic unit B-1. The rear portion of the plate 153 has mounting brackets 154 welded or otherwise secured thereto in a manner similar to the brackets 152 and to which are connected links 155 for pivotal movement. The lower ends of the links 155 are pivotally connected to a common shaft 156 which is mounted through openings in upstanding arms or brackets 157. A gear 158 is connected to the shaft 156 and it is in engagement with a worm gear 160 which is suitably mounted on the upper side of the platform 145 in brackets 162 and 163. A control handle 160a is provided for rotating the worm gear 160 to cause the gear 158 to turn for thereby turning the shaft 156. As the shaft 156 is turned, the links 155 are caused to pivot therewith and the support plate 153 is moved upwardly or downwardly.

The support plate 153 carries a suitable means for holding the radiographic unit B-1 in position thereon, and as illustrated in the drawings, such means include clamps 170 which not only hold the unit B-1 on the platform 153, but also hold annular lead shields 171 and 172 in position with a restricted opening 173 provided therebetween through which the X-ray or other rays from the radiographic unit B-1 are emitted. A lower semi-cylindrical shield 174 is also preferably utilized to limit the emission of the rays from the unit B-1 in a direction generally upwardly towards the weld W-1 which is to be subjected to such rays for making a film record.

The adjustability of the position of the unit B-1 with respect to the guide means or rail assembly R which is provided by the adjustment of the position of the links 155 serves to position the X-ray unit B-1 in the proper position with respect to the weld W-1 regardless of the size of the pipe P-1 through which the unit B-1 is moved. Also, it will be observed that the restricted opening 173 of the unit B-1 is forward of the forward wheels 146 for the carriage A-1 so that even though the wheels 146 reach the limit of their travel on the rail assembly R, the unit B-1 may still move to the end of the pipe P-1 without requiring an additional section of pipe known as a "pup" joint temporarily welded thereto.

The limit of the movement of the unit B-1 as it moves along the weld W-1 in the pipe P-1 may be controlled automatically by including a microswitch 180 on the rail assembly R for contact by one of the mounting brackets 147 for one of the wheels 146 so that upon contact with such microswitch 180, the power to the motor or other source of power may be cut off to prevent further movement of the chain 120, except in the reverse direction.

As the carriage A-1 moves along the rail assembly R, electrical power for operating the X-ray unit or other radiographic unit B-1 is supplied through a power cable or electric line 181 which is preferably mounted upon a wind-up reel 182 which maintains the electric cable or wire 181 substantially taut at all times. The electrical line 181 is connected by any suitable means to a source of electrical power in the known manner. The movement of the carriage A-1 is accomplished by connecting the platform 145 to the chain 120 with a hook 185 which is in engagement with a pair of the links forming the chain 120. Any suitable means other than the hook 185 may be used so long as there is a connection between the chain 120 and the platform 145.

In the operation or use of the form of the invention shown in FIGS. 8-10, the rail assembly R, with the unit B-1 mounted on the carriage A-1 is positioned with the forward wheel 140 in the bottom of the pipe P-1. The rear wheel 142 is positioned on the ground G and the entire rail assembly R is moved forwardly with the carriage A-1 positioned thereon, but prior to supplying any power to the chain 120 for moving same. The entire rail assembly R is thus pushed through the full length of the pipe P-1 until the front wheel 140 drops at the other end of the pipe P-1 to the position shown in FIG. 8 so that the bottom of the rail assembly R rests upon the bottom portion of the pipe P-1 as shown in FIGS. 8 and 9. The position of the wheel 142 is then adjusted upwardly or downwardly for leveling the rail means R and while at least the forward portion of the rail means R remains in contact with the bottom surface of the pipe P-1. The position of the radiographic unit B-1 is then adjusted to locate it in close proximity to the weld W-1 of the particular size of pipe P-1 in which it is being used. The unit B-1 will of course initially be at the right hand end of the pipe P-1 (as viewed in FIG. 8), and the rail means R will extend sufficiently to the right of the pipe P-1 so that the restricted opening 173 can be started at the very right hand end of the pipe P-1. If fixed film cassettes are to be used for making the film record such as are indicated in FIGS. 8 and 9, the cassettes, each of which is made up of a central X-ray film 190 and lower and upper layers 191 and 192, respectively, of intensifier material are positioned as shown in FIGS. 8 and 9. Such cassettes in effect form a continuous strip of film 190 between the intensifier layers 191 and 192. The intensifier material forming the layers 191 and 192 would of course be conventional X-ray intensifier material or similar material if other types of radiographic rays are utilized. Of course, it will be understood that the film carrier C and the structure therewith may be utilized in conjunction with the form of the invention shown in FIGS. 8-10 if so desired. If such is the case, then a Selsyn motor or generator 193 having a shaft 193a connected to a wheel 194 is mounted at the forward end of the platform 145 so that the wheel 194 engages the upper surface of the channel section 112 (FIGS. 8 and 9). Suitable wires similar to those indicated in FIG. 1 will of course be provided from the Selsyn motor 193 to the Selsyn motor 48 mounted on the carrier C, if such carrier C is utilized. The carrier C will thus be moved at the same rate of travel as the radiographic unit B-1.

In any event, whether the fixed film as shown in FIGS. 8 and 9 is utilized, or the movable film carrier C of FIG. 1 is utilized, when it is desired to begin the making of the film record with the rays emitted from the unit B-1, electrical power is supplied to the unit B-1 through the electrical leads 181, and the chain 120 is caused to move in a direction to move the carriage A-1 from the right hand end of the pipe P-1 to the left hand end thereof. During such movement, the unit B-1 will continually emit rays from the restricted area 173 and such rays will be emitted in a narrow band or beam with substantially parallel sides as explained previously in connection with the unit B of FIG. 1. The film 190, or the film F used with the carrier C will thus be exposed to the X-rays or other radiographic rays passing through the weld W-1 to form a film record thereof. The film record is thus obtained of the entire longitudinal length of the weld W-1. After the film record has been made, and the movement of the carriage A-1 is stopped by the engagement of the mounting bracket 147 with the microswitch 180, the entire assembly shown in FIG. 8 may be removed from the pipe P-1 by lifting the forward end of the assembly R upwardly to position the wheel 140 in the bottom of the pipe P-1 again and to thereafter pull the entire apparatus to the right as viewed in FIG. 8 with the handle 143 or other suitable means. In some instances, if the unit B-1 is positioned extremely close to the weld W-1, the unit B-1 is lowered prior to the raising of the forward end of the rail assembly R, as will be self-evident.

Although the apparatus of this invention has been described and illustrated in connection with subjecting welds in pipes to radiographic rays, it should be understood that the invention is not limited to use in pipes, but may include use for welds in sheets which are flat or have other shapes. For example, the rail assembly R could be positioned on the ground if the wheels 140 and 142 and the structure below the channel sections 112 and 114 are eliminated. In such case, the sheet with the weld could be positioned on supports above the unit B-1. Other variations of and uses for the disclosed apparatus will also readily occur to those skilled in the art.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A method of making a film record with a radiographic unit, comprising the steps of, moving a radiographic unit having a small focal area of radiographic rays emitted therefrom relative to an area to be subjected to the rays therefrom, providing a film on the other side of said area, restricting the rays transmitted from the radiographic unit to the film so that only a beam of rays having substantially parallel sides reaches the film, subjecting the film to the rays which pass through said area while said radiographic unit is moving relative to said area, and maintaining the focal area of the rays in a fixed direction relative to the direction of movement of the radiographic unit as the unit moves relative to said area.

2. A method of making a film record in a pipe with a radiographic unit comprising the steps of, moving a radiographic unit having a small focal area of radiographic rays emitted therefrom longitudinally in a pipe relative to a weld in the pipe, providing a film outside of the pipe adjacent the weld in the pipe, restricting the rays transmitted from the radiographic unit to the film so that only a beam of rays having substantially parallel sides reaches the film, subjecting the film to the rays from the unit which pass through the weld to the film as the unit moves in the pipe, and maintaining the focal area of the rays in a fixed direction relative to the direction of movement of the radiographic unit as the unit moves relative to said area.

3. A method of making a film record in a pipe with a radiographic unit, comprising the steps of, moving a radiographic unit having a small focal area of radiographic rays emitted therefrom longitudinally in a pipe relative to a longitudinal weld in the pipe, providing a film outside of the pipe adjacent the weld in the pipe, restricting the rays transmitted from the radiographic unit to the film so that only a beam of rays having substantially parallel sides reaches the film, subjecting the film to the rays from the unit which pass through the weld to the film as the unit moves in the pipe, and maintaining the focal area of the rays in a fixed direction relative to the direction of movement of the radiographic unit as the unit moves relative to said area.

4. A method of making a film record in a pipe with a radiographic unit, comprising the steps of, moving a radiographic unit having a small focal area of radiographic rays emitted therefrom longitudinally in a pipe relative to a circumferential weld in the pipe, providing a film outside of the pipe adjacent the weld in the pipe, restricting the rays transmitted from the radiographic unit to the film so that only a beam of rays having substantially parallel sides reaches the film, subjecting the film to the rays from the unit which pass through the weld to the film as the unit moves in the pipe, and maintaining the focal area of the rays in a fixed direction relative to the direction of movement of the radiographic unit as the unit moves relative to said area.

5. A method of making a film record with a radiographic unit, comprising the steps of, moving a radiographic unit relative to an area to be subjected to the rays therefrom, feeding a film on the other side of said area at the same rate as said unit moves relative to said area, and restricting the rays which are emitted from the radiographic unit to those which lie in a plane substantially perpendicular to the path of travel of the unit relative said area.

6. An apparatus for radiographic work, comprising a radiographic unit having a small focal area of radiographic rays emitted therefrom, means for moving said radiographic unit on one side of an area to be subjected to the rays from the radiographic unit, a film on the other side of said area, means for restricting the rays transmitted from the radiographic unit to the film so that only a beam of rays having substantially parallel sides reaches the film, means for subjecting the film to the rays from said radiographic unit which pass through said area while said radiographic unit is moving relative to said area, and means for maintaining the focal area of the rays in a fixed direction relative to the direction of movement of the radiographic unit as the unit moves relative to said area.

7. An apparatus for radiographic work, comprising a radiographic unit, means for moving said radiographic unit on one side of an area to be subjected to the rays from the radiographic unit, a film carrier having film therewith for making a film record of the area subjected to the rays from the radiographic unit, means for moving said film carrier on the other side of the area in synchronization with the movement of said radiographic unit, and means for feeding said film in said carrier to position said film over the successive areas subjected to the rays at the same rate as the unit moves relative to such areas.

8. An apparatus for radiographic work, comprising a radiographic unit, means for moving said radiographic unit on one side of an area to be subjected to the rays from the radiographic unit, a film carrier on the other side of said area having an aperture open to the rays from said radiographic unit, a film mounted in said carrier which is sensitive to the rays from said radiographic unit, means for moving said carrier at a speed synchronized with the movement of said unit to maintain said rays and said aperture in substantially the same alignment at all times, means for feeding said film across said aperture at a rate corresponding to the movement of said carrier to prevent relative movement between the portion of the film at said aperture and the area subjected to the rays, and means for transmitting a narrow width beam from said radiographic unit through said area to said film as said unit and carrier move relative to said area to expose only a restricted area of said film at a particular time whereby blurring of images on said film by the movement of the carrier and the radiographic unit is prevented.

9. An apparatus for use in radiographic work, comprising a radiographic unit adapted to emit radiographic rays therefrom, a housing having an opening therein through which the radiographic rays from said unit pass, said opening being in alignment with said rays, a film supply reel in said housing adapted to hold a roll of film, a film take-up reel in said housing adapted to receive the film as it is fed thereto from said supply reel, guide means for guiding the film across said opening from said supply reel to said take-up reel, intensifier material separate from said film and in contact with at least one side of the successive portions of the film guided across said opening for movement in response to and at the same speed as the film movement, said intensifier material being positioned in alignment with said opening so that the radiographic rays passing through said film also pass through said intensifier material, and means for rotating said take-up reel for feeding the film from said supply reel to said take-up reel and across said opening and for thereby also feeding said intensifier material with the film to prevent relative movement therebetween.

10. A film holder for use in radiographic work, comprising a film supply reel adapted to hold a roll of film, a film take-up reel spaced from said supply reel and adapted to receive the film as it is fed thereto from said supply reel, and an endless belt of intensifier material separate from the film and extending around said reels and in contact with said film on said reels and the portion therebetween for moving in response to the movement of said film and at the same speed as said film is fed from said supply reel to said take-up reel.

11. An apparatus for radiographic work in a tubular body comprising, a carriage frame, means for mounting a radiographic unit on said frame, a rotatable wheel assembly mounted with said frame for rotation relative to said frame, said rotatable wheel assembly including at least one wheel positioned at an angle with respect to the longitudinal axis of the tubular body and engageable with the inner wall of said tubular body, and means for rotating said wheel assembly for causing said one wheel to impart a longitudinal force to said frame as said wheel assembly is rotated for thereby moving said frame longitudinally in said tubular body.

12. An apparatus for radiographic work in a tubular body comprising, a carriage frame, means for mounting a radiographic unit on said frame, a rotatable wheel assembly mounted with said frame for rotation relative to said frame, said rotatable wheel assembly including a central drive shaft, a plurality of circumferentially spaced wheel supporting arms connected to said shaft, and a wheel on each of said arms, each wheel being skewed with respect to the longitudinal axis of the tubular body and are in engagement therewith, and power means on the frame for rotating said shaft and said arms to cause said wheels to impart a longitudinal force to said frame as they are rotated in rolling contact with the tubular body for thereby moving said frame longitudinally in said tubular body.

13. An apparatus for radiographic work in a tubular body comprising, a carriage frame, means for mounting a radiographic unit on said frame, a rotatable wheel assembly mounted with said frame for rotation relative to said frame, said rotatable wheel assembly including at least one wheel positioned at an angle with respect to the longitudinal axis of the tubular body and engageable with the inner wall of said tubular body, means for rotating said wheel assembly for causing said one wheel to impart a longitudinal force to said frame as said wheel assembly is rotated for thereby moving said frame longitudinally in said tubular body, and additional wheels on said frame which are aligned with the longitudinal axis of the tubular body and spaced longitudinally from said wheel assembly.

14. An apparatus for radiographic work in a tubular body comprising, a carriage frame, means for mounting a radiographic unit on said frame, a rotatable wheel assembly mounted with said frame for rotation relative to said frame, said rotatable wheel assembly including a central drive shaft, a plurality of circumferentially spaced wheel supporting arms connected to said shaft, and a wheel on each of said arms, each wheel being skewed with respect to the longitudinal axis of the tubular body and are in engagement therewith, power means on the frame for rotating said shaft and said arms to cause said wheels to impart a longitudinal force to said frame as they are rotated in rolling contact with the tubular body for thereby moving said frame longitudinally in said tubular body, and additional wheels on said frame which are aligned with the longitudinal axis of the tubular body and spaced longitudinally from said wheel assembly.

15. An apparatus for radiographic work in a tubular body comprising, a carriage frame, means for mounting a radiographic unit on said frame, a rotatable wheel assembly mounted with said frame for rotation relative to said frame, said rotatable wheel assembly including a central drive shaft, a plurality of circumferentially spaced wheel supporting arms connected to said shaft, and a wheel on each of said arms, each wheel being skewed with respect to the longitudinal axis of the tubular body and are in engagement therewith, power means on the frame for rotating said shaft and said arms to cause said wheels to impart a longitudinal force to said frame as they are rotated in rolling contact with the tubular body for thereby moving said frame longitudinally in said tubular body, and adjusting means for moving said arms towards and away from said shaft to cause said wheels to engage the inner walls of tubular bodies of different internal diameters.

16. An apparatus for radiographic work, comprising a radiographic unit, a carriage for said unit, guide means for guiding said carriage in a predetermined path relative to a weld for thereby moving said radiographic unit relative to the weld, and a film on the side of the weld opposite from said radiographic unit for exposure to the rays from said radiographic unit as it moves relative to said weld for thereby obtaining a film record of said weld as the unit is moving.

17. The structure set forth in claim 16, wherein said carriage includes a plurality of wheels, and wherein said guide means includes a rail assembly having track means for receiving and guiding said wheels as they rotate and move relative to the rail assembly.

18. The structure set forth in claim 16, including support means for supporting said radiographic unit in a position ahead of said carriage, and adjusting means for moving said radiographic unit towards and away from said carriage to adjust the height thereof with respect to said carriage.

19. The structure set forth in claim 16, wherein said carriage includes a plurality of wheels, wherein said guide means includes a rail assembly having track means for receiving and guiding said wheels as they rotate and move relative to the rail assembly, and a chain drive means movable relative to said rail assembly and having connection with said carriage for moving same relative to said weld.

20. An apparatus for radiographic work, comprising a radiographic unit, a carriage for said unit, guide means for guiding said carriage in a predetermined path relative to a weld for thereby moving said radiographic unit relative to the weld, a film carrier having a film strip therein on the side of the weld opposite from said radiographic unit, means for moving said film carrier relative to said weld at a rate which is coordinated with the rate of movement of said carriage, and means for feeding said film at the same rate of movement as said film carrier so as to continuously expose new film to the weld during such movement.

21. An apparatus for radiographic work comprising, a radiographic unit, means including an electrical circuit for moving said unit toward an area to be subjected to the rays from said unit, detector means spaced away from and out of contact with said area at all times for stopping the movement of said unit when said unit is in the proper position for directing the radiographic rays therefrom to said area, said detector means including a magnet adapted to create a magnetic field for extending through said area to be subjected to rays from said radiographic unit, and an electrical switch in said electrical circuit adapted to be switched from a closed position to an open position by the magnetic field passing through said area thereby opening said electrical circuit to disconnect the electrical power provided for the means for moving said unit.

22. A method of making a film record with a radiographic unit, comprising the steps of, effecting relative movement between a radiographic unit and the area to be subjected to the rays therefrom wherein the radiographic unit has a small focal area of radiographic rays emitted therefrom, providing a film on the other side of said area, restricting the rays transmitted from the radiographic unit to the film so that only a beam of rays having substantially parallel sides reaches the film, subjecting the film to the rays which pass through said area while said relative movement is effected between said radiographic unit and said area, and maintaining the focal area of the rays in a fixed direction with respect to the direction of relative movement between said unit and said area.

23. A film holder for use in radiographic work, comprising a film supply reel adapted to hold a roll of film a film take-up reel spaced from said supply reel and adapted to receive the film as it is fed thereto from said supply reel, a pair of guide rolls offset from said supply reel and said take-up reel for guiding the portion of said film between said supply reel and said take-up reel, a first endless intensifier belt surrounding said reels and said rolls and in contact with the film thereon for movement in response to and at the same speed as the film movement, and a second endless intensifier belt on said guide rolls and also engaged by said film for movement in response to and at the same speed as the film movement.

24. A method of making a film record with a radiographic unit, comprising the steps of, effecting a relative movement between a radiographic unit and a body wherein the unit emits a beam of radiographic rays with substantially parallel sides therefrom, locating a film on the other side of said body from said unit passing the beam of rays from said unit through said body to said film during the relative movement between said unit and said body, and maintaining the beam of the rays in a fixed direction during the relative movement between the unit and the body.

25. A method of making a film record with a radiographic unit, comprising the steps of, effecting a relative movement between a radiographic unit and a body wherein the unit emits a beam of radiographic rays with substantially parallel sides therefrom, feeding a strip of film on the other side of said body from said unit at the same rate as the relative movement between said unit and said body, passing the beam of rays from said unit through said body to said film during the relative movement between said unit and said body, and maintaining the beam of the rays in a fixed direction during the relative movement between the unit and the body.

26. An apparatus for radiographic work, comprising a radiographic unit adapted to be positioned on one side of a body for subjecting the body to rays from the unit, a film on the other side of the body, means for restricting the rays transmitted from the radiographic unit to the film so that only a beam of rays having substantially parallel sides reaches the film, means for effecting relative movement between said unit and the body while the beam of rays is transmitted to successive portions of the film, and means for maintaining the focal area of the rays in a fixed direction with respect to the direction of relative movement between said unit and said body.

27. The structure set forth in claim 26, wherein said film is in a roll mounted in a film carrier, said carrier including means for feeding the film from the roll at the same rate of speed as the relative movement between said unit and said body.

References Cited in the file of this patent

UNITED STATES PATENTS

| | | |
|---|---|---|
| 2,000,497 | Pohl | May 7, 1935 |
| 2,340,923 | Boucher | Feb. 8, 1944 |
| 2,409,436 | Krasnow et al. | Oct. 15, 1946 |
| 2,412,174 | Rhoades | Dec. 3, 1946 |
| 2,482,813 | Urbach | Sept. 27, 1949 |
| 2,484,436 | Wangerin et al. | Oct. 11, 1949 |
| 2,503,759 | Murray | Apr. 11, 1950 |
| 2,528,724 | Herzog | Nov. 7, 1950 |
| 2,532,536 | Boucher | Dec. 5, 1950 |
| 2,587,056 | McElroy et al. | Feb. 26, 1952 |
| 2,687,477 | Pfaff | Aug. 24, 1954 |
| 2,742,631 | Rajchman et al. | Apr. 17, 1956 |
| 2,756,343 | Johnson | July 24, 1956 |
| 2,847,580 | Arvanetakis et al. | Aug. 12, 1958 |
| 2,859,349 | Bradley et al. | Nov. 4, 1958 |
| 2,940,302 | Scherbatskoy | June 14, 1960 |